US00RE47649E

(19) United States
(12) Reissued Patent
Jones et al.

(10) Patent Number: US RE47,649 E
(45) **Date of Reissued Patent: *Oct. 15, 2019**

(54) BREAKER AND DISPLACEMENT FLUID AND METHOD OF USE

(71) Applicant: M-I L.L.C., Houston, TX (US)

(72) Inventors: Andrew G. K. Jones, Cape Town (ZA); Mark Luyster, Houston, TX (US); Raul Navarro-Mascarell, Celaya (MX)

(73) Assignee: M-I L.L.C., Houston, TX (US)

( * ) Notice: This patent is subject to a terminal disclaimer.

(21) Appl. No.: 15/406,393

(22) Filed: Jan. 13, 2017

Related U.S. Patent Documents

Reissue of:
(64) Patent No.: 8,932,999
Issued: Jan. 13, 2015
Appl. No.: 12/032,879
Filed: Feb. 18, 2008

U.S. Applications:
(60) Provisional application No. 60/890,586, filed on Feb. 19, 2007.

(51) Int. Cl.
*C09K 8/506* (2006.01)
*C09K 8/54* (2006.01)
*C09K 8/524* (2006.01)
*C09K 8/528* (2006.01)

(52) U.S. Cl.
CPC ..... *C09K 8/524* (2013.01); *C09K 8/528* (2013.01); *C09K 2208/26* (2013.01)

(58) Field of Classification Search
CPC ..... C09K 8/524
USPC ..... 507/244
See application file for complete search history.

(56) References Cited

U.S. PATENT DOCUMENTS 4,169,818 A 10/1979 DeMartino
4,533,487 A 8/1985 Jones
5,247,992 A 9/1993 Lockhart
5,458,197 A 10/1995 Chan
6,218,342 B1 4/2001 Patel
6,436,880 B1 * 8/2002 Frenier ..... C09K 8/52 507/131
6,451,224 B1 * 9/2002 Wilson ..... C11D 3/042 252/182.29
6,494,263 B2 12/2002 Todd et al.
6,631,764 B2 10/2003 Parlar et al.
6,790,811 B2 9/2004 Patel
6,806,233 B2 10/2004 Patel
6,983,798 B2 * 1/2006 Todd ..... C09K 8/06 166/278
7,134,496 B2 11/2006 Jones et al.
8,869,893 B2 * 10/2014 Navarro ..... C09K 8/26 166/278
8,985,211 B2 * 3/2015 Jones ..... C09K 8/035 166/281
9,493,697 B2 * 11/2016 Luyster ..... C09K 8/528
2003/0216263 A1 11/2003 Tibbles et al.
2004/0147404 A1 7/2004 Thaemlitz et al.
2005/0155761 A1 7/2005 Blauch et al.
2005/0276769 A1 * 12/2005 Herrlein ..... A61K 8/0208 424/63
2006/0102349 A1 5/2006 Brady et al.
2006/0223714 A1 * 10/2006 Svoboda ..... C09K 8/32 507/203
2007/0281868 A1 12/2007 Pauls et al.
2008/0035340 A1 2/2008 Welton et al.
2016/0152884 A1 * 6/2016 Ravitz ..... E21B 37/06 507/241
2017/0058183 A1 * 3/2017 Luyster ..... C09K 8/528

FOREIGN PATENT DOCUMENTS

EP 1178099 A2 2/2002
EP 1991634 A1 11/2008
WO 0161148 A2 8/2001
WO 03036021 A2 5/2003

OTHER PUBLICATIONS

International Search Report and Written Opinion, mailed Aug. 6, 2008 for International Application No. PCT/US2008/053176, filed Feb. 6, 2008.
Office Action to European Patent Application No. 08729160.5 dated Feb. 24, 2014, 7 pages.

* cited by examiner

*Primary Examiner* — Timothy J. Kugel
(74) *Attorney, Agent, or Firm* — Osha Liang LLP

(57) ABSTRACT

A method of cleaning a wellbore prior to the production of oil or gas is disclosed, wherein the wellbore has been drilled with an invert emulsion drilling mud that forms an invert emulsion filter cake. The method may include the steps of circulating a breaker fluid into the wellbore, where the breaker fluid includes an aqueous fluid, and imino diacetic acid or salt thereof. Optionally an acid buffering agent, and a weighting age are also included. The breaker fluid is formulated such that after a predetermined period of time and the filter cake present in the wellbore or on the wellbore face is substantially degraded. Other methods may also include drilling the wellbore with a water-based drilling mud that forms a water-based filter cake, wherein the method may include the steps of circulating a breaker fluid into the wellbore, where the breaker fluid may include an aqueous fluid, and an iminodiacetic acid or a salt thereof.

13 Claims, No Drawings

BREAKER AND DISPLACEMENT FLUID AND METHOD OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application, pursuant to 35 U.S.C. § 119(e), claims priority to U.S. Provisional Application Ser. No. 60/890,586, filed Feb. 19, 2007, and is hereby incorporated by reference in its entirety.

BACKGROUND OF INVENTION

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

In most subterranean drilling procedures the drilling fluid takes the form of a "mud," i.e., a liquid having solids suspended therein. The solids function to impart desired properties to the drilling fluid such as to increase the density thereof in order to provide a suitable hydrostatic pressure at the bottom of the well. The drilling mud may be either a water-based or an oil-based mud. One of skill in the art should appreciate that an oil-based mud is typically based on a combination of oil and water in the form of an invert (water in oil) emulsion.

Drilling muds may further include polymers, biopolymers, clays and organic colloids to obtain the required viscous and filtration properties. Heavy minerals, such as barite, manganese oxides, hematite, iron oxides, calcium carbonate, may be added to increase density. Solids from the formation are incorporated into the mud and often become dispersed in the mud as a consequence of drilling. Further, drilling muds may contain one or more natural and/or synthetic polymeric additives, including polymeric additives that affect the rheological properties (e.g., plastic viscosity, yield point value, gel strength) of the drilling mud, and polymeric thinners and flocculants.

Polymeric additives included in the drilling fluid may act as fluid loss control agents. Fluid loss control agents, such as starch, xanthan gums, synthetic polymers and the like are designed to prevent the loss of fluid to the surrounding subterranean formation by reducing the permeability of filter cakes formed on the newly exposed rock surface. In addition, polymeric additives may be employed to impart sufficient carrying capacity and thixotropy to the mud to enable the mud to transport the cuttings up to the surface and to prevent the cuttings from settling out of the mud when circulation is interrupted.

Many drilling fluids may be designed to form a thin, low-permeability filter cake to seal permeable subterranean formations penetrated by the drill bit. The filter cake is essential to prevent or reduce both the loss of fluids into the subterranean formation and the influx of fluids present in the subterranean formation. Upon completion of drilling, the filter cake may stabilize the wellbore during subsequent completion operations such as placement of a gravel pack in the wellbore. Filter cakes often comprise bridging particles, cuttings created by the drilling process, polymeric additives, and precipitates. One feature of a drilling fluid is to retain these solid and semi-solid particles as a stable suspension, free of significant settling over the time scale of drilling operations.

The selection of the type of drilling fluid to be used in a drilling application involves a careful balance of both the good and bad characteristics of the drilling fluids in the particular application and the type of well to be drilled. The primary benefits of selecting an oil-based drilling fluid, also known as an oil-based mud, include: superior hole stability, especially in shale formations, formation of a relatively thinner filter cake than the filter cake achieved with a water-based mud, excellent lubrication of the drilling string and downhole tools, and penetration of salt beds without sloughing or enlargement of the hole, as well as other benefits that should be known to one of skill in the art.

An especially beneficial property of oil-based muds is their excellent lubrication qualities. These lubrication properties permit the drilling of wells having a significant deviation from vertical, as is typical of off-shore or deep water drilling operations or when a horizontal well is desired. In such highly deviated holes, torque and drag on the drill string are a significant problem because the drill pipe lies against the low side of the hole. Often the torque that must be applied to the drill string is high when water-based muds are used. In contrast, oil-based muds provide a thin, slick filter cake that helps to reduce the torque on the drill pipe, and thus the use of the oil-based mud can be justified.

Despite the many benefits of using oil-based muds, they have disadvantages. In general, the use of oil-based drilling fluids and muds have high initial and operational costs. These costs can be significant depending on the diameter and depth of the hole to be drilled. However, the higher costs can often be justified if the oil-based drilling fluid prevents the caving in or hole enlargement that can greatly increase drilling time and costs.

Disposal of oil-coated drilling cuttings is another primary concern, especially for off-shore or deep-water drilling operations. In these latter cases, the cuttings must be either washed clean of the oil with a detergent solution that also must be disposed, or the cuttings must be shipped back to shore for disposal in an environmentally safe manner. Another consideration that must be taken into account is the local governmental regulations that may restrict the use of oil-based drilling fluids and muds for environmental reasons.

Oil-based muds typically contain some water, either from the formulation of the drilling fluid itself, or water may be intentionally added to affect the properties of the drilling fluid or mud. In such water-in-oil type emulsions, also known as invert emulsions, an emulsifier is used to stabilize the emulsion. In general, the invert emulsion may contain both water soluble and oil soluble emulsifying agents.

Typical examples of such emulsifiers include polyvalent metal soaps, fatty acids and fatty acid soaps, and other similar suitable compounds that should be known to one of ordinary skill in the art.

After any completion operations have been accomplished, removal of filter cake (be it water based or oil based) remaining on the sidewalls of the wellbore may be necessary. Although filter cake formation is essential to drilling operations, the filter cake can be a significant impediment to the production of hydrocarbon or other fluids from the well if, for example, the rock formation is plugged by the filter cake. The filter cake can also be a significant impediment to using the well as an injection well through which gas (nitrogen, carbon dioxide, natural gas and the like) or aqueous fluids may be injected into the formation in a secondary or tertiary recovery process. Because filter cake is compact, it often adheres strongly to the formation and may not be readily or completely flushed off of the face of the formation by fluid action alone.

The removal of water-based filter cake has been conventionally achieved with water based treatments that include: an aqueous solution with an oxidizer (such as persulfate), a hydrochloric acid solution, organic (acetic, formic) acid, combinations of acids and oxidizers, and aqueous solutions containing enzymes. For example, the use of enzymes to remove filter cake is disclosed in U.S. Pat. No. 4,169,818. Chelating agents (e.g., EDTA) have also been used to promote the dissolution of calcium carbonate. According to traditional teachings, the oxidizer and enzyme attack the polymer fraction of the filter cake and the acids typically attack the carbonate fraction (and other minerals). Generally, oxidizers and enzymes are ineffective in breaking up the carbonate portion, and acid are ineffective on the polymer portions.

One of the most problematic issues facing filter cake removal involves the formulation of the clean-up solutions. For example one of the more common components in a filter cake is calcium carbonate, a clean-up solution would ideally include hydrochloric acid, which reacts very quickly with calcium carbonate. However, while effective in targeting calcium carbonate, such a strong acid is also reactive with any calcium carbonate in the formation (e.g., limestone), and it may be reactive or chemically incompatible with other desirable components of the clean-up solution. Further the clean-up solution can permeate into the formation, resulting in unanticipated losses, damage to the formation that subsequently result in only a partial clean-up or loss of well control.

The use of traditional emulsifiers and surfactants in the invert drilling fluid systems that formed the filter cake can further complicate the clean-up process in open-hole completion operations. Specifically, fluids using traditional surfactant and emulsifier materials may require the use of solvents and other surfactant washes to penetrate the oil-based filter cake and reverse the wettability of the residual particles. Invert emulsion drilling fluids that exhibit an acid induced phase change reaction have been previously described in U.S. Pat. Nos. 6,218,342, 6,790,811, and 6,806,233 and U.S. Patent Publication No. 2004/0147404, the contents of which are incorporated by reference in their entirety. The fluids disclosed in these references all contain one form or another of an ethoxylated tertiary amine compound that stabilizes the invert emulsion when it is not protonated. Upon protonation of the amine compound, the invert emulsion reverses and becomes a regular emulsion. In most cases, deprotonation of the amine compound allows for the reformation of an invert emulsion. The clean-up of wells drilled with this invert emulsion drilling fluid may be simplified by using a wash fluid that contains an acid in a concentration sufficient to protonate the amine surfactant in the drilling fluid (and hence the filter cake).

The problems of efficient well clean-up, stimulation, and completion are a significant issues in all subterranean wells, and especially open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly. Thus there exists a continuing need for completion and displacement fluids that effectively remove the residual filter cake, clean the well bore and do not inhibit the ability of the formation to produce oil or gas once the well is placed on production.

Accordingly, there exists a need for a displacement and clean-up solution that will remove water base filter cake and emulsion based filter cake without damaging the formation while allowing for easy placement of the solution in the wellbore and providing sufficient hydrostatic control for a period of time when mechanical devices can be placed in the wellbore or activated remotely.

SUMMARY OF INVENTION

In one aspect, the present invention a method of cleaning a wellbore, wherein the wellbore has been drilled with an invert emulsion drilling mud that forms an invert emulsion filter cake. The illustrative method involves circulating a breaker fluid into the wellbore, and waiting for a predetermined period of time so that the invert emulsion of the filter cake substantially degrades.

An illustrative breaker fluid can be formulated to include an aqueous fluid; and at least one iminodiacetic acid or a salt thereof represented by the formula

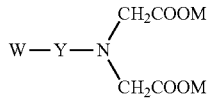

(I)

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group. Alternatively the breaker fluid may also contain an acidic buffering agent so as to maintain the pH below a predetermined value, preferably a value of about 3.

The acidic buffering agent may be selected from the group acid and acid generating compounds for example mineral acids including hydrochloric acid, hydrobromic acid, nitric acid, sulfuric acid, phosphoric acid and mixtures of these, organic acids including carboxylic acids such as formic, acetic, proprionic, butyric acids, fatty acids in the C5 to C30 range, haloacetic acids, alkyl phosphonic acids, alkyl sulfonic acids; compounds that hydrolyze to form acids in situ including hydrolysable anhydrides of carboxylic acids, hydrolysable esters of carboxylic acids; hydrolysable esters of phosphonic acid, hydrolysable esters of sulfonic acid and combinations and mixtures of these and similar such compounds as will be known to one of skill in the art. The breaker fluid may further include a weighting agent such as a high density brine containing water soluble salts of alkali and alkaline earth metals.

Other aspects and advantages of the invention will be apparent from the following description and the appended claims.

DETAILED DESCRIPTION

In one aspect, embodiments disclosed herein are generally directed to chemical breaker and displacement fluids that are useful in the drilling, completing, and working over of subterranean wells, preferably oil and gas wells. The displacement and completion fluids may be formulated such that they form a water based fluid or an invert emulsion based fluid. The usefulness of the fluids disclosed herein is not dependent on the use of ethoxylated tertiary amines in the fluids used to drill the well, however, the inclusion of such compounds as a component of the drilling fluid enhances the activity of the present fluids. Regardless, the broad applicability and usefulness of the fluids disclosed herein is greatly enhanced.

As noted above, in one embodiment the breaker fluid may be a water based fluid that may include an aqueous fluid and at least one iminodiacetic acid or salt thereof. Additionally, the water based fluid may optionally include a water soluble polar organic solvent, an acidic buffering agent such as mineral acids, organic acids, and compounds that hydrolyze to form acids in situ such as a hydrolysable anhydrides or esters of a carboxylic acid; a viscosifying agent, a weighting agent such as a high density brine solution, scale inhibitors, corrosion inhibitors, mutual solvents and combinations of these and other commonly known agents as disclosed below. The aqueous fluid used in the water based fluids may be selected from the group including sea water, a brine containing organic and/or inorganic dissolved salts, liquids containing water-miscible organic compounds and combinations thereof and similar compounds that should be known to one of skill in the art.

In an alternative embodiment, the breaker fluid may be an invert emulsion based fluid that may include a non-oleaginous internal phase and an oleaginous external phase. The non-oleaginous internal phase includes at least one iminodiacetic acid (or salt thereof) and may further include a water soluble polar organic solvent, an acidic buffering agent such as mineral acids, organic acids, and compounds that hydrolyze to form acids in situ such as a hydrolysable anhydride or ester of a carboxylic acid, a weighting agent such as a high density brine solution, a viscosifying agent, and combinations of these and other commonly known agents as disclosed below. The oleaginous external phase may include an oleaginous fluid such as diesel or other suitable hydrocarbon or synthetic oil, and an emulsifier. Optionally other components may include a viscosifying agent, a wetting agent, corrosion inhibitors, scale inhibitors, cleaning solvents and other such compounds as described below and which as should be known to one of skill in the art.

The oleaginous fluid used for formulating the invert emulsion fluids used in the practice of the present invention are liquids and are more preferably a natural or synthetic oil and more preferably, the oleaginous fluid is selected from the group including diesel oil, mineral oil, synthetic oils such as ester based synthetic oils, polyolefin based synthetic oils (i.e. saturated and unsaturated polyalpha olefin, saturated and unsaturated long chain internal olefins), polydiorganosiloxanes, siloxanes or organo-siloxanes, and mixtures thereof and similar compounds that should be known to one of skill in the art. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid at least about 30 percent, preferably at least about 40 percent, and more preferably at least about 50 percent by volume of the total fluid. In one embodiment, the amount of oleaginous fluid is from about 30 to about 95 percent by volume and more preferably from about 40 to about 90 percent by volume of the invert emulsion fluid.

The non-oleaginous fluid used in the formulation of the invert emulsion based fluids is a liquid and preferably is an aqueous liquid. More preferably, the non-oleaginous fluid may be selected from the group including sea water, a brine containing organic and/or inorganic dissolved salts, liquids containing water-miscible organic compounds and combinations thereof and similar compounds that should be known to one of skill in the art. The amount of the non-oleaginous fluid is typically less than the theoretical limit needed for forming an invert emulsion. In various embodiments, the amount of non-oleaginous liquid is at least about 1, preferably at least about 5, and more preferably greater than about 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume and preferably from about 1% to about 70% by volume. In another embodiment, the non-oleaginous fluid is preferably from about 10% to about 60% by volume of the invert emulsion fluid.

The iminodiacetic acids (and salts thereof) for use in the present invention are at least one or more of the compounds represented by the following formula (I) and are synthesized as a corresponding amino acid or amino alcohol derivative using known methods:

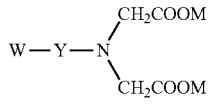

(I)

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group. In the iminodiacetic acids (salts) represented by formula I of the present invention, the —COOM group is preferably a carboxyl group or an alkali metal salt or ammonium salt thereof. The alkali metal atom is sodium or potassium and preferably is sodium. Examples of groups represented by Y in formula I are set forth below.

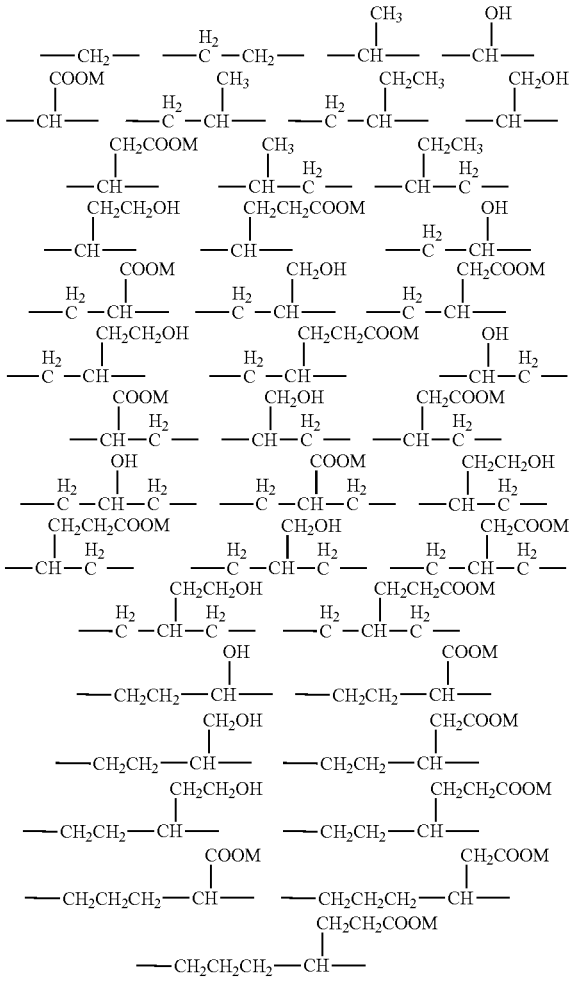

Examples of iminodiacetic acids (salts) include .alpha.-alanine-N,N-diacetic acid (salt), .beta.-alanine-N,N-diacetic acid (salt), aspartic acid-N,N-diacetic acid (salt), glutamic acid-N,N-diacetic acid (salt), serine-N,N-diacetic acid (salt), ethanolamine-N,N-diacetic acid (salt), iminodiacetic acid (salt) and nitrilotriacetic acid (salt), among which glutamic acid-N,N-diacetic acid (salt) is preferably used in this invention. These iminodiacetic acids (salts) are compounds having a chelating ability and are considered to enhance the degradation, dispersion, dissolution or clean-up of the filter cake as a result of complexing with any free calcium ion due to a chelating action. The well bore fluids of the present invention contain one or more of these iminodiacetic acids (salts). In one embodiment, the iminodiacetic acids (salts) comprises from about 1 to 99 percent by weight of a water-based breaker fluid, and preferably from about 10 to 50 percent by weight and more preferably less than 30 percent by weight. In another embodiment, the iminodiacetic acids (salts) comprises from about 1 to about 50 weight percent of an invert emulsion-based breaker fluid, and preferably about 5 to about 25 weight percent and more preferably, less than 15 weight percent.

As noted above a number of other components may be included in the formulation of the fluids disclosed herein. In selecting these other components, one must take into account the type of fluid being created (i.e. water-based v. invert emulsion based), the components of the filter cake that is to removed, the downhole conditions, etc. . . . . Routine laboratory testing will provide guidance as to which components are helpful or detrimental to achieving the desired results.

In embodiments where a water soluble polar organic solvent is utilized, the water soluble polar organic solvent should be at least partially soluble in an oleaginous fluid, but should also have partial solubility in an aqueous fluid. The polar organic solvent component of the present invention may be a mono-hydric, di-hydric or poly-hydric alcohol or a mono-hydric, di-hydric, or poly-hydric alcohol having poly-functional groups. Examples of such compounds include aliphatic diols (i.e., glycols, 1,3-diols, 1,4-diols, etc.), aliphatic poly-ols (i.e., tri-ols, tetra-ols, etc.), polyglycols (i.e., polyethylenepropylene glycols, polypropylene glycol, polyethylene glycol, etc.), glycol ethers (i.e., diethylene glycol ether, triethylene glycol ether, polyethylene glycol ether, etc.) and other such similar compounds that may be found useful in the practice of the present invention. In one preferred embodiment, the water soluble organic solvent is a glycol or glycol ether, such as ethylene glycol mono-butyl ether (EGMBE). Other glycols or glycol ethers may be used in the present invention so long as they are at least partially miscible with water.

The acidic buffering agent is utilized in some embodiments to enhance the solubility of the filtercake solids and chelated compounds that may form when using the fluids disclosed herein. Suitable acid buffing agents are those agents that can maintain the pH of the aqueous phase such that the formation of precipitates, especially precipitates of the iminodiacetic acids (salts), does not take place. For example when glutamic acid-N,N-diacetic acid (salt) is utilized, the pH of the aqueous phase should be maintained below a level of about 3 in order to avoid the formation of calcium glutamic acid-N,N-diacetic acid precipitate. Routine laboratory testing and observation along with consultation with the known literature properties of the iminodiacetic acids (salts) will lead one of skill in the art to a determination of this pH level for each of the iminodiacetic acids (salts) compounds disclosed. For example, the desired level of pH can be routinely determined in the laboratory prior to field use by simply titrating sufficient acid into the fluid so as to avoid formation of a precipitate. A wide variety of acidic and acid generating materials may be utilized as acidic buffering agents. Illustrative examples of such acidic buffering agents include mineral acids, such as hydrochloric acid, hydrobromic acid, nitric acid, sulfuric acid, phosphoric acid and mixtures of these, organic acids such as carboxylic acids such as formic, acetic, proprionic, butyric acids, as well as fatty acids in the C5 to C30 range, haloacetic acids, alkyl phosphonic acids, alkyl sulfonic acids and the like. In one embodiment a mixture of mineral and organic acids are utilized, preferably hydrochloric acid and formic acid. In addition compounds that hydrolyze to form acids in situ may be utilized as acid buffing agents. Illustrative examples of such compounds include hydrolysable anhydrides of carboxylic acids, hydrolysable esters of carboxylic acids; hydrolysable esters of phosphonic acid, hydrolysable esters of sulfonic acid and other similar hydrolysable compounds that should be well known to those skilled in the art.

In one embodiment, a hydrolysable ester is selected such that the time to achieve hydrolysis is predetermined on the known downhole conditions, such as temperature. It is well known in the art that temperature, as well as the presence of a hydroxide ion source, has a substantial impact on the rate of hydrolysis of esters. For a given acid, for example formic aid, one of skill in the art can conduct simple studies to determine the time to hydrolysis at a given temperature. It is also well known that as the length of the alcohol portion of the ester increases, the rate of hydrolysis decreases. Thus, by systematically varying the length and branching of the alcohol portion of the ester, the rate of release of the formic acid can be controlled and thus the breaking of the emulsion of an invert emulsion filter cake can be predetermined. In one preferred embodiment, the hydrolysable ester of a carboxylic acid is a formic acid ester of a C4 to C30 alcohol. In another embodiment the hydrolysable ester is C1 to C6 carboxylic acid and a C2 to C30 poly alcohol including alkyl orthoesters may be used. In one embodiment, the hydrolysable ester of the carboxylic acid comprises from about 1 to 30 volume percent of a water-based breaker fluid, and preferably from about 5 to 15 volume percent. In another embodiment, the hydrolysable ester of the carboxylic acid will comprise from about 0.5 to about 15 volume percent of an invert emulsion-based breaker fluid, and preferably, from about 1 to about 10 volume percent.

In an illustrative embodiment, weighting agent is utilized to increase the density of the overall fluid so as to match that of the drilling fluid and to provide sufficient hydrostatic head so that the well can remain under control. Preferably a high density brine containing salts of alkali and alkaline earth metals is used to weight-up the fluids disclosed herein. For example, brines formulated with high concentrations of sodium, potassium, or calcium salts of the halides, formate, acetate, nitrate, and the like; cesium salts of formate, acetate, nitrate, and the like, as well as other compounds that should be well known to one of skill in the art, can be used as solids free weighting agents. The selection of a weighting agent may partially depend upon the desired density of the breaker fluid, as known by one of ordinary skill in the art.

The emulsifier used in the formulation of the illustrative invert emulsion breaker fluid will be selected so as to form a stable invert emulsion. The selection of the emulsifier may be such that the invert emulsion breaks with time and/or upon application of heat. For example the emulsifier may be selected such that when the pH of the invert emulsion's non-oleaginous phase changes, the emulsifier's hydrophilic-lipophilic balance (HLB) value is sufficiently shifted to destabilize the invert emulsion. One of skill in the art should know that the HLB value indicates the polarity of the molecules in a range of 1 to 40 that increases with increasing hydrophilicity of the emulsifier. Given the large variety of invert emulsion emulsifiers available, one of ordinary skill in the art need only do a routine screen of emulsifiers by forming an invert emulsion to select an emulsifier suitable for use in the fluids disclosed herein. In one embodiment, an emulsifier can selected such that after forming the invert emulsion and the addition of a small amount of formic acid will result in the emulsion breaking. Preferred emulsifiers may include VERSAWET™ and VERSACOAT™, which are commercially available from M-I L.L.C., Houston, Tex. Alternatively, an amine-based acid sensitive emulsifier such as those described in U.S. Pat. Nos. 6,218,342, 6,790,811, and 6,806,233, the contents of which are incorporated by reference herein, may be used. Examples of such emulsifiers are commercially available from M-I L.L.C., Houston Tex. under the tradename FazeMul.

Both the invert emulsion fluids and water based fluids of the present invention may further contain additional chemicals depending upon the end use of the fluid so long as they do not interfere with the functionality of the fluids described herein. For example, wetting agents, organophilic clays, viscosifiers, fluid loss control agents, surfactants, dispersants, interfacial tension reducers, pH buffers, mutual solvents, thinners, thinning agents, scale inhibition agents, corrosion inhibition agents, cleaning agents and a wide variety of the other components known to one of skill in the art may be added to the fluid compositions of this invention for additional functional properties. The addition of such agents and the reasons for doing so should be well known to one of ordinary skill in the art of formulating drilling fluids (also known as drilling muds,) completion fluids, spacer fluids, clean-up fluids, fracturing fluids, and other similar wellbore fluids.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art. However, when used with the invert emulsion fluids that undergo a pH controlled phase change, the use of fatty acid wetting agents should be minimized so as to not adversely affect the reversibility of such invert emulsions as disclosed herein. Faze-Wet™, VersaCoat™, SureWet™, Versawet™ and Versawet™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Organophilic clays, normally amine treated clays, may be useful as viscosifiers and/or emulsion stabilizers in the fluid composition of the present invention. Other viscosifiers, such as oil soluble polymers, polyamide resins, polycarboxylic acids and soaps may also be useful. The amount of viscosifier used in the composition can vary upon the end use of the composition. However, normally about 0.1% to 6% by weight range is sufficient for most applications. VG-69™ and VG-PLUS™ and VG-Supreme are organoclay materials distributed by M-I, L.L.C., Houston, Tex., and Versa-HRP™ is a polyamide resin material manufactured and distributed by M-I, L.L.C., that may be used in this invention. Other examples of commercially available compounds include the Bentone™ line of products produced by Rheox as well as similar such materials widely known and available in the drilling fluids industry.

Suitable thinners that may be used in the breaker fluids disclosed herein include, for example, lignosulfonates, modified lignosulfonates, polyphosphates, tannins, and low molecular weight polyacrylates. Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing fluid properties at elevated temperatures.

The inclusion of cleaning agents in the fluids disclosed herein should be well known to one of skill in the art. A wide variety of synthetic and natural product derived cleaning agents may be used. For example, a common natural product derived cleaning agent is d-limonene. The cleaning ability of d-limonene in well drilling applications is disclosed in U.S. Pat. No. 4,533,487, and in combination with various specialty surfactants in U.S. Pat. No. 5,458,197, the contents of which are incorporated herein.

The methods used in preparing both the water-based and invert emulsion breaker fluids utilized in the methods of the present disclosure are not critical. Specifically, with respect to the invert emulsion fluids, conventional methods can be used to prepare the invert emulsion fluids in a manner analogous to those normally used to prepare oil-based drilling fluids. In one representative procedure, a desired quantity of oleaginous fluid, such as C16-C18 internal olefin, is mixed with the selected water in oil emulsifier, a viscosifying agent, and a wetting agent. The internal non-oleaginous phase is prepared by combining a polar organic co-solvent, an imino diacetic acid salt and a hydrolysable ester into the selected brine with continuous mixing. An invert emulsion of the present invention is formed by vigorously agitating, mixing, or shearing the oleaginous fluid and the non-oleaginous fluid in a conventional manner to form the invert emulsion.

The breaker fluids disclosed herein may be used in various embodiments as a displacement fluid and/or a wash fluid. A displacement fluid is typically used to physically push another fluid out of the wellbore, and a wash fluid typically contains a surfactant and may be used to physically and chemically remove drilling fluid reside from downhole tubulars and/or the residual filtercake in the open hole. In some embodiments, the viscosity of the breaker fluids will be sufficiently high such that the breaker fluid may exhibit a dual role and act as its own displacement pill in a well. Thus in one embodiment, a water-based breaker fluid and/or the invert emulsion breaker fluid may be used as a displacement fluid to push fluids out of a wellbore. For example an invert emulsion breaker fluid as disclosed herein may act as a push pill or displacement fluid to effectively displace the invert emulsion drilling mud. A water based breaker fluid may act as a displacement fluid to effectively displace brine from the wellbore. In yet another embodiment, the water-based breaker fluid and/or invert emulsion breaker fluid may further be used as a wash fluid to physically and/or chemically remove the invert emulsion filter cake once the filter cake has been disaggregated by the breaker system.

In one embodiment, a breaker fluid as disclosed herein may be utilized in a method of cleaning a wellbore that has been drilled with either a water-based drilling mud or an invert emulsion based drilling mud. One of skill in the art will appreciate that in such instances a water-based filter cake or an invert emulsion filter cake will be formed on the face of the wellbore. The breaker fluid may be circulated into the wellbore, contacting the filter cake and any residual mud present downhole. The breaker fluid can be allowed to remain in the downhole environment until such time as the well is brought into production. The breaker fluid may also be circulated in a wellbore that is to be used as an injection well to serve the same purpose (i.e. remove the residual mud and filter cake) prior to the well being used for injection of materials (such as water surfactants, carbon dioxide, natural gas, cuttings, etc. . . . ) into the subterranean formation.

If a wellbore that has already begun production of hydrocarbons (or injection operations) and it is believed to be impaired by any residual filter cake left in the well following the drilling operations, a breaker fluid of the present invention may be used to clean the wellbore. In such a case, remedial operations will be necessary to place the breaker fluid into the downhole environment. For example a work over rig can utilize coiled tubing to conduct such remedial activity as one of skill in the art should appreciate. Thus the fluids disclosed herein may be used in work over operations and other remedial well activity.

Generally, a well is often "completed" to allow for the flow of hydrocarbons out of the formation and up to the surface. One of skill in the art should appreciate that completion processes may include the strengthening the well hole with casing, evaluating the pressure and temperature of the formation, and installing the proper completion equipment to ensure an economic flow of hydrocarbons out of the well or in the case of injector well allow the injection of gas or aqueous fluids into the subterranean formation. Completion operations may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, a open hole gravel pack, or casing.

Another embodiment of the present invention involves a method of cleaning up a well bore drilled with the invert emulsion drilling fluid described above. In one such illustrative embodiment, the method involves circulating a breaker fluid disclosed herein in a wellbore, which has been drilled to a larger size (i.e., under reamed) with an invert emulsion drilling mud, and then shutting in the well for a predetermined amount of time. During such time period, the invert emulsion based filter cake breaks, thus forming two phases, and oil phase and a water phase. These two phases can be easily produced from the well bore upon initiation of production and thus the residual drilling fluid is easily removed from the well bore.

The fluids disclosed herein may also be used in a wellbore where a screen is to be put in place down hole. After a hole is under-reamed to widen the diameter of the hole, drilling string may be removed and replaced with production tubing having a desired sand screen. Alternatively, an expandable tubular sand screen may be expanded in place or a gravel pack may be placed in the well. Breaker fluids may then be placed in the well, and the well is then shut in for a predetermined period of time. During this time period, the filter cake is dispersed/degraded/broken down. In some instances, such as when an invert emulsion based drilling mud was used in the under-reaming process, the breaker fluids can be designed to form two phases, an oil phase and a water phase which can easily produced from the wellbore upon initiation of production. Regardless of the fluid used to conduct the under-reaming operation, the breaker fluids disclosed herein effectively degrade the filtercake and substantially remove the residual drilling fluid from the wellbore upon initiation of production.

It should be appreciated that the amount of delay between the time when a breaker fluid according to the present invention is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period necessary to shut-in a well given a specific downhole temperature and a specific formulation of the breaker fluid.

However it should also be appreciated that the breaker fluid formulation itself and thus the fluid's chemical properties may be varied so as to allow for a desirable and controllable amount of delay prior to the breaking of invert emulsion filter cake for a particular application. In one embodiment, the amount of delay for an invert emulsion filter cake to be broken with a water-based displacement fluid according to the present invention may be greater than 1 hour. In various other embodiments, the amount of delay for an invert emulsion filter cake to be broken with a water-based displacement fluid according to the present invention may be greater than 3 hours, 5 hours, or 10 hours. Thus the formulation of the fluid can be varied to achieve a predetermined break time and downhole temperature.

One of skill in the art should appreciate that in one embodiment, the amount of delay for an water based filter cake to be broken with a water based breaker fluid may be greater than 15 hours. In various other embodiments, the amount of delay for an water-based filter cake to be broken with a water based breaker fluid may be greater than 24 hours, 48 hours, or 72 hours. In second embodiment, the amount of delay for an invert emulsion filter cake to be broken with a water-based breaker fluid may be greater than 15 hours. In various other embodiments, the amount of delay for an invert emulsion filter cake to be broken with a water based breaker fluid may be greater than 24 hours, 48 hours, or 72 hours. In a third embodiment, the amount of delay for an invert emulsion filter cake to be broken with an invert emulsion displacement fluid may be greater than 15 hours. In various other embodiments, the amount of delay for an invert emulsion filter cake to be broken with an invert emulsion displacement fluid may be greater than 24 hours, 48 hours, or 72 hours.

The following examples are provided to further illustrate the application and the use of the methods and compositions of the present invention. Unless otherwise noted, standard laboratory practices were utilized during the formulation and testing described below using commercial grade or better chemicals. The rheological measurements were made using the procedures set forth is the applicable American Petroleum Institute Bulletins, such API 13A-D. In some instances, proprietary products were utilized including: ECF-986 is a sodium salt of glutamic acid-N,N-diacetic acid; ECF-974 is a hydrolysable ester of formic acid and C4 to C30 alcohol; ECF-979 is a phosphonic acid scale preventor utilized as an acid buffer; Flo-V is Plus is a dispersible and clarified xanthan gum; FloTrol is a hydroxypropylated starch; Safe Carb is a size calcium carbonate. All of the above noted materials are commercially available from M-I, L.L.C. (Houston, Tex.) or their functional equivalent are available from other competitive drilling fluids companies.

The following examples demonstrate the effectiveness of the solutions disclosed herein:

Example 1

A water based polymer drill-in fluid was formulated to contain: water (141.65 ppb); 11.2 ppg $CaCl_2$ (pre-mixed with dry $CaCl_2$) 251.42 ppb; Flo-V is Plus 0.75 ppb; FloTrol 7.00 ppb; magnesium oxide 1.50 ppb; sized calcium carbonate 30 ppb composed of Safe Carb 10 1.00 ppb; Safe Carb 20 2.00 ppb; Safe Carb 40 23.00 ppb; and, Safe Carb 250 4.00 ppb (commercially available from M-I, L.L.C. (Houston, Tex.). The polymer mud was heat-aged by hot rolling for 16 hours at 155° F. and exhibited the following properties, as shown in Table 1.

TABLE I

| Heat aged @ 155° F. • 16 hrs Rheology at 120° F. | |
|---|---|
| 600 RPM | 95 |
| 300 RPM | 65 |

TABLE I-continued

| Heat aged @ 155° F. • 16 hrs Rheology at 120° F. | |
|---|---|
| 200 RPM | 55 |
| 100 RPM | 38 |
| 6 RPM | 10 |
| 3 RPM | 8 |
| Gels 10" | 8 lbs/100 $ft^2$ |
| Gels 10' | 9 lbs/100 $ft^2$ |
| Plastic Viscosity | 30 cP |
| Yield Point | 35 lbs/100 $ft^2$ |

A filter cake built from the above water base polymer drill-in fluid was subjected to a modified High Temperature High Pressure (HTHP) filtration test. The HTHP Filtration test utilized a HTHP cell fitted with a fritted disk as a porous medium, on which the filter cake was built. In this example the filter cake was built on a 35 microns disk. Upon application of 500 psi at 155° F. to the disk of the filter cake, effluent was collected as shown in Table 2.

TABLE 2

| Time | Disk |
|---|---|
| Spurt | 4.6 |
| 1 min | 4.8 |
| 4 min | 5.4 |
| 9 min | 6.8 |
| 16 min | 7.4 |
| 25 min | 8.0 |
| 30 min | 8.7 |
| 2 hrs | 13.0 |

A water based displacement breaker fluid was formulated having the following components, all of which are commercially available, as shown below in Table 3.

TABLE 3

| | |
|---|---|
| 14.2 ppg $CaBr_2$ briue | 180.0 ppb |
| ECF-986 | 102.00 ppb |
| ECF-979 | 0.2% (v/v) |

The breaker fluid was added to the filter cake disk formulated from the water base polymer drill-in fluid, and subjected to a modified HTHP Filtration test. Upon the application of an initial pressure of 500 psi at 155° F. to the disk of filter cake having the breaker fluid poured thereon, effluent was collected as shown in Table 4. The modified HTHP cell was then shut in at a pressure of 100 psi at 155° F. for 48 hours. From an initial production flow of 200 mls of LVT 200 base oil fluid of 24.29 sec and a final production flow of 200 ml LVT-200 base oil fluid of 24.8 sec. a return to production flow rate of 97.94% was calculated for this test.

TABLE 4

| Time | Disk |
|---|---|
| Spurt | 0.2 ml |
| 1 min | 1.5 ml |
| 4 min | 1.8 ml |
| 9 min | 2 ml |
| 16 min | 2.2 ml |
| 25 min | 3.25 ml |
| 30 min | 4 ml |

One of skill in the art should appreciate that a high production flow rate and removal of the filter cake was achieved by the breaker fluid. It should be noted that upon examination of the disk, some precipitation of solid material was observed on the fritted disk. Based on analysis of the precipitate, the precipitate is believed to be a chelated form of ECF-986 caused by a rise in the pH of the solution. We have found and one skilled in the art would appreciate that the inclusion of a low pH buffer system so as to maintain a low pH value in the breaker solution prevents the formation of this precipitate.

Example 2

A water base polymer drill-in fluid, containing: water 315.00 ppb; Dry $CaCl_2$ 77.95 ppb; Flo-V is L 1.76 ppb; FloTrol 7.00 ppb; magnesium oxide 1.50 ppb; sized carbonate 30 ppb, was formulated and heat aged at 200° F. for 4 hrs and exhibited the following initial properties, as shown in Table 5.

TABLE 5

| Heat aged @ 200° F. • 4 hrs Rheology @ 120° F. | |
|---|---|
| 600 RPM | 63 |
| 300 RPM | 43 |
| 200 RPM | 35 |
| 100 RPM | 25 |
| 6 RPM | 5 |
| 3 RPM | 4 |
| Gels 10" | 6 lbs/100 $ft^2$ |
| Gels 10' | 20 lbs/100 $ft^2$ |
| Plastic Viscosity | 20 cP |
| Yield Point | 23 lbs/100 $ft^2$ |

The drill-in fluid was hot rolled at 155° F. for 16 hours and filter cakes built from the above water base polymer drill-in fluid were subjected to a modified High Temperature High Pressure (HTHP) filtration test. The HTHP Filtration test utilized a HTHP cell fitted with a fritted disk as a porous medium, on which the filter cake was built. In this example the filter cakes were built on a 35 microns disks. Upon application of 500 psi at 155° F. to the disk of the filter cake, effluent was collected as shown in Table 6.

TABLE 6

| Time | Disk 1 | Disk 2 | Disk 3 | Disk 4 | Disk 5 |
|---|---|---|---|---|---|
| Spurt | 4.6 ml | 4.6 ml | 4.4 ml | 5.2 ml | 3.4 ml |
| 1 min | 1.4 ml | 1 ml | 1.6 ml | 1.2 ml | 1.0 ml |
| 4 min | 2.4 ml | 2.2 ml | 2.4 ml | 2.2 ml | 1.8 ml |
| 9 min | 3.4 ml | 3 2 ml | 3.4 ml | 3.6 ml | 2.6 ml |
| 16 min | 4.6 ml | 4.0 ml | 4.4 ml | 4.8 ml | 3.0 ml |
| 25 min | 5.4 ml | 5.2 ml | 5 ml | 5.8 ml | 4.0 ml |
| 30 min | 6.0 ml | 5.4 ml | 5.6 ml | 6.0 ml | 4.6 ml |
| 16 hrs | 29.5 ml | 28.0 ml | 29.0 ml | 30.2 ml | 13.0 ml |

Water based breaker fluids were formulated in divalent brines having the following components; all of which are commercially available, as shown in Table 7.

TABLE 7

| Product | Unit | Fluid 1 | Fluid 2 | Fluid 3 | Fluid 4 | Fluid 5 |
|---|---|---|---|---|---|---|
| ECF-986 | ppb | 46.20 | 46.20 | 46.20 | 46.20 | 46.20 |
| Formic Acid | % (v/v) | 2.86 | 3.86 | 2.86 | 2.86 | 3.86 |
| HCl (34% (w/w)) | % (v/v) | x | 1.43 | 2.86 | x | 2.86 |
| Water | ppb | 101.5 | 102 | 101.5 | 101.5 | 70.00 |
| ECF 974 | ppb | x | x | x | 10 | |
| 14.2 ppg $CaBr_2$ | ppb | 65.53 | 65.53 | 65.53 | 65.53 | x |
| 11.6 ppg $CaCl_2$ | ppb | x | x | x | x | 97.30 |
| Density | lb/gal | 10.4 | 10.4 | 10.4 | 10.4 | 10.25 |
| pH | | 1.49 | 1.28 | 0.99 | 2.65 | 0.44 |

Breaker fluids 1 thru 5 were added to filter cakes 1 thru 5 respectively, formulated from water based drill-in fluid, and subjected to a modified HTHP Filtration test. Upon application of an initial pressure of 400 psi at 155° F. to the disks of the filter cake having breaker fluids 1 thru 5 poured thereon, effluent was collected until breakthrough, represented by a steady stream of effluent resulted through the disk. After 400 psi was applied until breakthrough, the applied pressure was reduced to 200 psi. With the reduction of pressure, the modified HTHP cell was shut-in. The filter cake disks were allowed to soak for 72 hours at 155° F. Visual examination of the disks 1 thru 5 showed full dissolution of the filter cake, however, Disk 1 showed a minimal amount of precipitate believed to be that of a chelated ECF-986.

Further, while reference has been made to particular applications for the displacement and completion fluids of the present invention, it is expressly within the scope of the present invention that these fluids may be in used in a variety of well applications. Specifically, the fluids of the present invention may be used in both producing and injection wells, and may have further application in remedial clean-up of wells.

Advantageously, the present invention provides for a wellbore fluid that may degrade/disperse/break down a filter cake and substantially remove such filter cake without inflicting damage on the surrounding formation. A delay in the dissolution of the filter cake may be achieved by controlling the effectiveness and reactivity of the chemical compositions of the breaker fluids disclosed herein. The chemical properties of the fluids disclosed herein may allow for the degradation of a water-based filter cake and the dissolution of acid soluble bridging materials in the filter cake. The chemical properties of the fluids disclosed herein may also allow for the degradation of the emulsion of the invert emulsion filter cake and the dissolution of acid soluble bridging materials in the filter cake. The displacement and breaker fluids disclosed herein may be effectively used with either conventional invert emulsion or reversible invert emulsion drilling fluid filter cakes as noted above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of cleaning a wellbore, wherein the wellbore has been drilled with an invert emulsion drilling mud that forms an invert emulsion filter cake, the method comprising:

circulating a breaker fluid into the wellbore, the breaker fluid comprising:

an aqueous fluid; and at least one iminodiacetic acid or a salt thereof represented by the formula

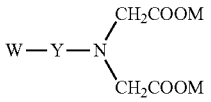

(I)

wherein [the M groups each independently represents a hydrogen atom, an alkali metal atom, an ammonium group or a substituted ammonium group;] Y represents a divalent alkyl group having from 1 to 7 carbon atoms and the divalent alkyl group may be substituted by a hydroxyl group or a COOM group [wherein M represents a hydrogen atom, an alkali metal atom, an ammonium group or a substituted ammonium group; and]; W represents a hydrogen atom, a hydroxyl group or a COOM group [wherein]; *and* M *each independently* represents a hydrogen atom, an alkali metal atom, an ammonium group or a substituted ammonium group;

wherein the breaker fluid is selected so that after a predetermined period of time the invert emulsion of the filter cake substantially degrades.

2. The method of claim 1, wherein the breaker fluid further includes an acidic buffering agent so as to maintain the pH below a value of about 3.

3. The method of claim 2, wherein acidic buffering agent is selected from the group consisting of mineral acids including hydrochloric acid, hydrobromic acid, nitric acid, sulfuric acid, phosphoric acid and mixtures of these, organic acids including carboxylic acids such as formic, acetic, propionic, butyric acids, fatty acids in the C5 to C30 range, haloacetic acids, alkyl phosphonic acids, alkyl sulfonic acids; compounds that hydrolyze to form acids in situ including hydrolysable anhydrides of carboxylic acids, hydrolysable esters of carboxylic acids; hydrolysable esters of phosphonic acid, hydrolysable esters of sulfonic acid and combinations thereof.

4. The method of claim 2, wherein the acidic buffering agent is a hydrolysable [ester of the carboxylic acid is a] formic acid ester of a C4 to C30 alcohol.

5. The method of claim 1, wherein the breaker fluid further includes a weighting agent that is a high density brine containing water soluble salts of alkali and alkaline earth metals.

6. The method of claim 1, further comprising:

removing the broken invert emulsion filter cake from the wellbore.

7. A method of producing a hydrocarbon from a formation, the method comprising:

drilling *a wellbore through* the formation with an invert emulsion drilling mud and thereby forming an invert emulsion filter cake on the formation;

performing at least one completion operation in the wellbore;

emplacing a breaker fluid in the wellbore, the breaker fluid comprising:

an aqueous fluid;

at least one iminodiacetic acid or a salt thereof represented by the formula

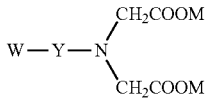

(I)

wherein [the M groups each independently represents a hydrogen atom, an alkali metal atom, an ammonium group or a substituted ammonium group;] Y represents a divalent alkyl group having from 1 to 7 carbon atoms and the divalent alkyl group may be substituted by a hydroxyl group or a COOM group [wherein M represents a hydrogen atom, an alkali metal atom, an ammonium group or a substituted ammonium group; and]; W represents a hydrogen atom, a hydroxyl group or a COOM group [wherein]; *and* M *each independently* represents a hydrogen atom, an alkali metal atom, an ammonium group or a substituted ammonium group; [and a weighting agent; and]

shutting the well for a predetermined time to allow the substantial degradation of the invert emulsion filter cake.

8. The method of claim 7, further comprising:

allowing the formation fluids to enter into the [well] *wellbore*; and producing fluids from the [well] *wellbore*.

9. The method of claim 8, wherein the completed wellbore contains at least one of a slotted liner, a predrilled liner, a wire wrapped screen, an expandable screen, a sand screen filter, a open hole gravel pack, and casing.

10. The method of claim 7, wherein the breaker fluid further includes an acidic buffering agent.

11. The method of claim 10, wherein the acidic buffering agent is a mixture of mineral acid and organic acid.

12. The method of claim [11] *10*, wherein the acidic buffering agent is a hydrolysable ester of a carboxylic acid.

*13. A solution, comprising:*

*an aqueous fluid;*

*at least one iminodiacedtic acid or a salt thereof represented by the formula*

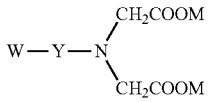

(I)

*wherein Y represents a divalent alkyl group having from 2 to 7 carbon atoms and the divalent alkyl group may be substituted by a COOM group, W represents a hydroxyl group or a COOM group, wherein each M independently represent a hydrogen atom, an alkali metal atom, an ammonium group or a substituted ammonium group;*

*an acidic buffering agent; and*

*a weighting agent,*

*wherein the aqueous fluid forms the discontinuous phase of an invert emulsion fluid.*

* * * * *